United States Patent [19]

Rowell et al.

[11] Patent Number: 4,804,384

[45] Date of Patent: Feb. 14, 1989

[54] ACETYLATION OF LIGNOCELLULOSIC MATERIALS

[75] Inventors: Roger M. Rowell, Madison, Wis.; Rune Simonson; Anne-Marie Tillman, both of Gothenburg, Sweden

[73] Assignee: The United States of America as represented by the Secretary of Agriculture, Washington, D.C.

[21] Appl. No.: 36,050

[22] Filed: Apr. 8, 1987

[51] Int. Cl.[4] .................... D06M 1/14; D06M 13/20; B05D 1/18; B05D 7/00
[52] U.S. Cl. ........................................ 8/121; 427/212; 427/440
[58] Field of Search ...................... 427/440, 212; 8/121

[56] References Cited

U.S. PATENT DOCUMENTS

| 2,417,995 | 3/1947 | Stamm et al. | 117/118 |
| 3,031,973 | 2/1936 | Mudge | 99/12 |
| 3,037,902 | 6/1962 | Fahey et al. | 162/157 |
| 3,094,431 | 6/1963 | Goldstein et al. | 117/59 |
| 3,649,341 | 3/1972 | Tammela et al. | 117/118 |
| 3,894,839 | 7/1975 | Marmer et al. | 8/121 |
| 3,985,921 | 10/1976 | Rowell et al. | 427/317 |
| 4,127,686 | 11/1978 | Motai | 427/351 |
| 4,194,033 | 3/1980 | Motai | 427/351 |
| 4,486,475 | 12/1984 | Shutov et al. | 427/351 |
| 4,592,962 | 6/1986 | Aoki et al. | 428/541 |

FOREIGN PATENT DOCUMENTS 579255 7/1946 United Kingdom .

OTHER PUBLICATIONS

Acetylation of Pinewood, Fuchs, Walter, Ber. 61B, 948-51 (1928).
Acetylation of Beechwood, Horn, O. Ber 61B:2542(1928).
Chemistry of Beechwood, Suida H. & Titsch, H. Ber. 61B, 1599-1928 (1928).
Acetylation and Preparation of Water-Soluble Degradation Products, Friese, H. Ber. 63B: 2538-50 (1929).
Dimensional Stabilization of Harelboard by Acetylation Klinga, L. O et al. Tappi vol. 49, No. 1 Jan. 1966.

Primary Examiner—Michael Lusignan
Attorney, Agent, or Firm—M. Howard Silverstein; David G. McConnell; John D. Fado

[57] ABSTRACT

Reaction of lignocellulosic material with uncatalyzed acetic anhydride in the absence of any cosolvent is disclosed. The process improves dimensional stability and resistance to biological attack of the lignocellulosic material. Lignocellulosic material is treated by exposure to liquid acetic anhydride for at least a short period of time, after which it is then heated to acetylate the material. The excess anhydride and byproduct acetic acid can be removed by vacuum.

18 Claims, 1 Drawing Sheet

ACETYLATION OF LIGNOCELLULOSIC MATERIALS

BACKGROUND OF THE INVENTION

1. Field of the Invention

This invention relates to the chemical treatment of lignocellulosic materials. More particularly, the invention relates to the treatment of wood and its derivative materials to obtain increased dimensional stability while improving resistance to biological attack.

2. Description of Related Art

Although wood possesses many unique and desirable properties, it has several undesirable properties which have limited its use for many applications. The physical and chemical properties of wood are the result of the chemistry of the cell wall polymers both individually and collectively.

Wood changes dimension with changing moisture content because the cell wall polymers contain hydroxyl and other oxygen-containing groups that attract moisture through hydrogen bonding. That moisture swells the cell wall, and the wood expands until the cell wall is saturated with water. Water, beyond this point, is free water in the void structure and does not contribute to further expansion. This process is reversible, and shrinkage occurs as moisture is lost.

Wood is biologically degraded because organisms recognize the polysaccharide polymers in the cell wall and have very specific enzyme systems capable of hydrolyzing these polymers into digestible units. Because high molecular weight cellulose is primarily responsible for strength in wood, strength is lost as this polymer undergoes biological degradation through oxidation, hydrolysis, and dehydration reactions.

Because dimensional instability and biological degradation are chemical phenomena, it is possible to improve both of these undesirable properties of wood by changing the basic chemistry of the cell wall polymers. By chemically modifying the cellulose and hemicellulose components, for example, the highly specific biological enzymatic reactions cannot take place because the chemical configuration and molecular conformation of the substrate has been altered. Bulking the cell wall by reacting chemicals to cellulose, the hemicelluloses and lignin would reduce the tendency of wood to swell with changes in moisture because the wood would already be in a partially, if not completely, swollen state.

If the hydroxyl groups on the cel wall polymer are esterified with acetic anhydride, both dimensional stability and resistance to biological attack can be achieved.

Although several methods of acetylating wood designed for stabilizing the dimensions or for biological resistance of wood and other cellulosic materials have been suggested, all have failed in achieving any real commercial significance. In general, the prior art methods suffer from one or more of the following disadvantages: the process is too cumbersome or time consuming, the process is too complicated, the process is excessively expensive, the process requires ovendry wood, or the process imparts undesirable properties to the products.

Wood flour or sawdust was acetylated by W. Fuchs (Ber. 61B: 94B (1928)) and O. Horn (Ber. 61B: 2542 (1928)) using acetic anhydride containing 0.25 percent sulfuric acid, while H. Suida and H. Titsch (Ber. 61B: 1599 (1928)) used acetic anhydride/pyridine mixtures or acetic anhydride alone, and the process involved treatments for 15 hours. In 1930, H. Friese (Ber. 63B: 1902) acetylated powdered wood with mixtures of acetic acid and acetic anhydride catalyzed by sulfuric acid. H. Suida (Austrian Pat. No. 122,499 (1930)) reacted wood with acetic anhydride using a tertiary organic base as a catalyst.

W. B. Ridgway and H. T. Wallington (British Pat. No. 579,255 (1946)) acetylated wood, either veneer or ground, with acetic anhydride using a multivalent metal halid as catalyst. The preferred treatment was a mixture of acetic anhydride, acetic acid, and zinc chloride for 24 hours at 38 degrees to 50 degrees Centigrade.

A. J. Stamm and H. Tarkow (U.S. Pat. No. 2,417,995 (1947)) treated ovendry wood veneers with a moisture-free acetylation medium containing acetic anhydride mixed with other components such as a tertiary amine and acetone. The preferred treatments are carried out as a vapor-phase operation with a mixture of acetic anhydride and pyridine. That acetylation procedure has not had commercial acceptance because of certain disadvantages, such as: (1) pyridine forms complexes making recovery difficult; (2) if the reaction temperature is too high, the pyridine body darkens the wood; (3) if the reaction temperature is too low, the reaction period is relatively long; and (4) the various operations require a substantial amount of handling of noxious or flammable chemicals.

In 1963 I. G. Goldstein and J. W. Weaver (U.S. Pat. No. 3,094,431) described an acetylation procedure that eliminated the catalyst. Acetic anhydride was combined with xylene to acetylate wood at 105 degrees Centigrade and 150 to 170 psi pressure under vacuum. While the procedure eliminated the use of a catalyst, it introduced a volatile, flammable organic cosolvent that required special handling and complicated and excess reagent and byproduct recovery.

It has also been shown by Klinga and Tarkow (Tappi, the Journal, the Technical Association of the Pulp and Paper Industry, Vol. 49, No. 1, January 1966) that it is possible to obtain a stabilization of hardboard by "uncatalyzed vapor-phase acetylation," however, the board contained aluminum sulfate which could act as a catalyst. The necessary exposition time was, however, very long, "overnight heating was adopted."

U.S. Pat. No. 3,037,902 to Fahey discloses the acetylation of cellulose, not wood, at very high temperatures ranging from 135 to 280 degrees Centigrade.

U.S. Pat. No. 4,592,962 to Aoki discloses a process for acetylating a wood material with an aqueous solution of an alkali metal acetate catalyst. Specifically, it discloses using a 5% solution of sodium acetate in a pretreatment, then drying, and finally acetylation.

U.S. Pat. No. 4,486,475 to Shutov et al. discloses a method of modifying wood with thermosetting resins.

U.S. Pat. No. 4,194,033 to Motai discloses a process of treating wood with alkylamine.

U.S. Pat. No. 4,127,686 to Motai discloses a process for treating wood with surface active agents.

U.S. Pat. No. 3,985,921 to Rowell et al. discloses reacting cellulosic materials with butylene oxide under mildly alkaline conditions to increase resistance to fungi while improving dimensional stability.

U.S. Pat. No. 3,894,839 to Marmer et al. discloses acetylation of materials using strong oxy acid and isopropenyl esters.

U.S. Pat. No. 3,649,341 to Tammela et al. discloses acetylation of cellulose using alkali metal acetate as a catalyst.

U.S. Pat. No. 3,094,431 to Goldstein et al. discloses the acetylation of wood using an organic cosolvent.

U.S. Pat. No. 2,417,995 to Stamm et al, discloses acetylation of wood but uses sodium acetate as a catalyst.

U.S. Pat. No. 2,031,973 to Mudge discloses impregnation of wood with mineral waxes.

As is evident from the foregoing, there are disadvantages connected to all the methods referred to. In fact, no method according to the prior art is suitable for acetylation on an industrial scale. Stabilization by acetylation has therefore been utilized in a very low degree in spite of the advantages the stabilized wood and wood products will have by use as a construction material. The high production cost and other drawbacks mentioned by the known methods have been a hindrance to their commercialization.

Thus, a primary object of this invention is to develop a process for acetylating lignocellulosic materials which does away with complex reaction mixtures and expensive pressure-treating equipment necessary with processes in the prior art.

A second object of this invention is a process which will increase dimensional stability and biological resistance to lignocellulosic materials.

Other objects and advantages will become apparent hereinafter from the description and drawing.

SUMMARY OF THE INVENTION

This invention is a greatly simplified method for catalyst-free acetylation of lignocellulosic material which comprises the steps of:

a. contacting the material with a reactant consisting essentially of acetic anhydride and from 0 percent to about 55 percent acetic acid;

b. heating the material at a temperature of up to 120° C. for a time sufficient to acetylate the material; and c. removing from the material unreacted acetic anhydride and acetic acid.

In a preferred embodiment wood in the form of chips, flakes, or particles is dipped into the reactant, drained of excess reactant, and heated at a temperature of from 100°–120° C. for from 1 to 5 hours. A mixture of unreacted acetic anhydride and acetic acid are then removed from the treated wood. This mixture can be collected and added back to the reactant.

Lignocellulosic material acetylated by the method of the invention shows good dimensional stability and resistance to attack by brown-rot fungi and soft-rot and tunnelling bacteria.

DETAILED DESCRIPTION OF THE INVENTION

Figure 1:
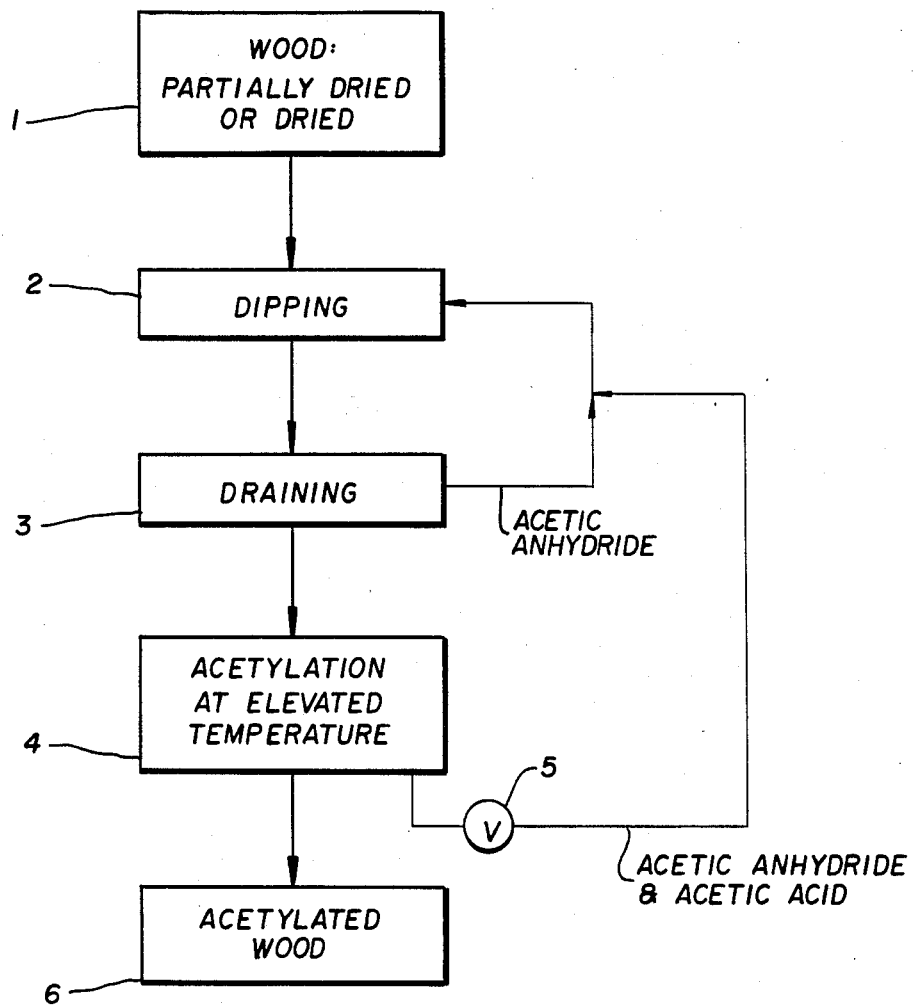
FIG. 1 schematically illustrates by flow diagrams a process for acetylation of lignocellulosic material in accordance with this invention.

The simple method of acetylation in accordance with the invention is based on the characteristic process steps a, b, and c. defined above. The practical performance of each step can be varied within the scope of the appended claims as illustrated below.

Before beginning the process it is preferred to dry the lignocellulosic material to be acetylated. Although the acetylation reaction can be carried out on lignocellulosic material with a high moisture content, an increasing content of water yields an increasing formation of byproduct acetic acid due to hydrolysis of the acetic anhydride. To avoid an unnecessarily high consumption of the reagent anhydride, the moisture content should not exceed 20 percent, preferably not exceed 10 percent by volume. For example solid wood boards, drying to a moisture content below about 5 percent can lead to distortion of the material and formation of cracks, and should accordingly be avoided. Also, when impregnating solid material with a large cross-section, impregnation with the liquid reagent is favored by the material being in a slightly swollen state, i.e. the material not being completely dry. In the production of particle- and flakeboards, the disintegrated material is normally processed at a moisture content of a few percent, and can conveniently be acetylated at such a moisture content.

In step a. the lignocellulosic material is contacted with a reactant consisting essentially of acetic anhydride and from 0% to about 55% acetic acid by volume, preferably from about 10% to about 30% acetic acid by volume. Depending on the kind and size of the material used, and the total processing to a final product, different process alternatives can be adopted. Lignocellulosic material in the form veneers, chips or flakes, fibers, particles and the like are the preferred starting materials. The lignocellulosic materials can be contacted by dipping or submerging the material in the reactant, the dipping time being adapted to the dimension of the material used, preferably for from 1 to 15 minutes. The lignocellulosic material can also be contacted with the proper amount of the reactant by spraying the material with the reactant. This operation is preferably carried out while tumbling the material in suitable equipment thereby ensuring an even distribution of the anhydride to the material.

Spraying and dipping can also be applied to material having larger dimensions, especially when aiming at surface treatment to certain depths. Such dimensional stabilization of the surface layer by acetylation can improve long-term adhesion of applied surface coatings and minimize formation of cracks and the loosening of the coatings.

For lignocellulosic material such as solid wood boards with larger cross-section the reactant is preferably impregnated into the wood by a vacuum or vacuum-pressure technique which ensures a more complete penetration into the entire material body.

It is preferred that, after contacting the lignocellulosic material with reactant, excess reactant not impregnated into the lignocellulosic material be removed to prevent handling of a manifold excess of reactant in the following process steps. The amount of chemicals that needs to be recovered and up-graded is thereby greatly reduced, and so is the cost of the process. In the preferred method of removing the excess reactant the impregnated material is simply lifted from the impregnation vessel and the excess reactant allowed to drain. With smaller sized material draining can be facilitated by the application of suction or compression.

In step b. the impregnated lignocellulosic material is placed in a heated chamber and the reaction allowed to proceed until a desired weight gain is obtained. The weight gain results from the addition of acetyl groups to the cellulose. An overall gain of from 13% to 21% is preferred. In softwoods the preferred weight gain is from 15% to 21% and in hard woods it is 13% to 18%.

The heated chamber is maintained at a temperature of up to 120° C., preferably at from 100° to 120° C. At lower temperatures the reaction rate is too low for practical uses, and at higher temperatures side reaction which degrade the lignocellulosic materials become too pronounced.

The duration of step b., preferably from 1 to 5 hours, depends primarily on the period of time necessary for the heat to penetrate the material which in turn depends of the dimension of the cross-section of the material. The heating also promotes the diffusion of anhydride to reactive sites in the material.

In step c. unreacted acetic anhydride and acetic acid (and volatile components of the material produced during heating) are removed, preferably by a gasflow through the heating chamber or by pulling a vacuum. The chemicals (i.e. unreacted acetic anhydride and acetic acid) can then be recovered by condensation. At this point the recovered chemicals can be added back to the reactant bath or they can be up-graded by fractional condensation. Acetic acid recovered in this manner can be reconverted into acetic anhydride, e.g. by reaction with ketene.

Each time the recovered chemicals are added back to the reactant bath the concentration of acetic acid increases. When the concentration of acetic acid exceeds about 30% by volume, reaction time begins to slow slightly. A preferred reactant mixture contains acetic anhydride and from 0% to about 55% acetic acid by volume. The most preferred concentration of acetic acid is from about 10% to about 30% by volume. However, reactant mixtures containing as high as 95% acetic acid will give acceptable add-ons but the reaction time becomes impractical.

The present invention is believed to have several advantages over the prior art in treating wood or its derivative material:

(1) Eliminates the need for an added catalyst.
(2) Eliminates the use of any cosolvents or diluents.
(3) Eliminates the need for high pressure during treatment.
(4) Reduces the time of treatment.
(5) Can be used to treat partially dried or dry wood.
(6) Greatly simplifies the recovery of excess reagents and byproducts.

DESCRIPTION OF THE PREFERRED EMBODIMENTS

Referring to FIG. 1, the partially dried or dry wood at 1 is submerged in acetic anhydride for a short period of time at 2. Excess acetic anhydride is drained from the wood at 3. The saturated wood is introduced into the treating chamber 4. The treating chamber is heated to 100 degrees to 120 degrees centigrade. The temperature is maintained for a period of time, preferably 1 to 5 hours (depending on the size and thickness of the wood). A vacuum is drawn on the heated chamber through valve 5 for 1 to 2 hours to remove excess acetic anhydride and byproduct acetic acid. This recovered solution is added back to the tank used to dip the wood in. The solution can be reused many times before separation is needed. The byproduct acetic acid can be reacted with ketene to regenerate the acetic anhydride.

As is evident from the description, if the product containing wood or wood in solid form is soaked in acetic anhydride and then treated with heat, the acetylation will be obtained in a relatively short time without the use of catalysts, cosolvents, or diluents. As will be evident from the following examples, a treatment period of 1 to 5 hours will be sufficient. For chips, flakes, and fibers the shorter period of time mentioned, 1 to 2 hours, will be sufficient while thicker wood has to be treated for a longer period of time.

A measure of the degree of acetylation of the wood is the weight gain as a result of the treatment. A control of the same has shown that a sufficient acetylation is reached by the process according to the invention by means of a treatment of the duration mentioned above.

The following examples are presented as further illustration of the invention.

EXAMPLE I

Wood samples of southern pine, ⅛ by 2 by 6 inches, were ovendried to 3 percent moisture content. The samples were submerged in acetic anhydride for 2 minutes. Excess reagent was allowed to drain from the wood for 5 minutes. The wood was placed in a preheated chamber at 120 degrees Centigrade and maintained for 4 hours at that temperature. A vacuum was applied at 120 degrees Centigrade for 2 hours. The treated samples were removed from the chamber and air dried for an additional 24 hours.

The drain solution from the cylinder consists of approximately 55 percent unreacted acetic anhydride (55 percent of original solution in wood) and 45 percent byproduct acetic acid with minor amounts of wood extractives. These can be separated by fractional distillation and the acetic acid reconverted to acetic anhydride by reaction with ketene.

The treatment of Example I results in 18 to 20 percent weight add-on. The same procedure was used to impregnate several different species of wood. The results of these reactions are shown in Table 1.

TABLE 1

| Example | Species | Weight percent gain |
|---------|---------|---------------------|
| II | Ponderosa pine | 18–22 |
| III | Douglas-fir | 18–21 |
| IV | Maple | 16–18 |
| V | Aspen | 16–19 |

EXAMPLE VI

Chips, flakes, or whole wood fibers of southern pine were ovendried to 3 percent moisture content. The samples were submerged in acetic anhydride for 1 minute. Excess reagent was allowed to drain from the samples for 3 minutes. The samples were placed in a preheated cylinder at 120 degrees Centigrade and maintained for 2 hours at that temperature. Recovery of reagents and byproducts are as given in Example I.

The treatment of Example VI results in an 18 to 22 percent weight add-on. The same procedure was used to impregnate several different species of wood and jute. The results of these reactions are shown in Table 2.

TABLE 2

| Example | Species | Weight percent gain |
|---------|---------|---------------------|
| VII | Douglas-fir | 16–18 |
| VIII | Maple | 16–19 |
| IX | Aspen | 16–19 |
| X | Jute | 14–16 |

EXAMPLE XI

Chips, flakes, or whole wood fibers at a moisture content of 20 percent moisture of southern pine were treated as given in Example VI. The treatment of Example XI results in 16 to 18 percent weight add-on. The same procedure was used to impregnate several different species of wood. The results of these reactions are shown in Table 3.

TABLE 3

| Example | Species | Weight percent gain |
|---------|---------|--------------------|
| XII | Douglas-fir | 16–18 |
| XIII | Aspen | 16–19 |

EXAMPLE XIV

Solid wood as prepared by the process in Example I through Example V and flakeboards made from flakes prepared by the process in Example VI through Example XIII were measured for dimensional stability.

Calculations for dimensional stability were as follows:

VOLUMETRIC SWELLING COEFFICIENT S $$S = \frac{V_2 - V_1}{V_1} \times 100$$

where
$V_2$ = wood volume after humidity conditioning or wetting with water
$V_1$ = wood volume of overdried specimen before humidity conditioning

REDUCTION IN SWELLING OR SHRINKING ASE $$ASE = \frac{S_1 - S_2}{S_1} \times 100$$

where
$S_2$ = treated volumetric swelling coefficient
$S_1$ = untreated volumetric swelling coefficient

TABLE 4

| Example | Species | Weight percent gain | ASE* |
|---------|---------|--------------------|------|
| I | Southern pine | 19.2 | 75 |
| II | Ponderosa pine | 19.8 | 72 |
| III | Douglas-fir | 18.6 | 70 |
| IV | Maple | 16.4 | 74 |
| V | Aspen | 17.2 | 78 |
| VI | Southern pine+ | 21.7 | 87+ |
| VII | Douglas-fir+ | 17.7 | 85+ |
| VIII | Maple+ | 16.4 | 83+ |
| IX | Aspen+ | 18.9 | 92+ |
| XI | Southern pine+ | 20.4 | 84+ |
| XII | Douglas-fir+ | 16.4 | 82+ |
| XIII | Aspen+ | 18.5 | 90+ |

*Dimensional stability reported as antishrink efficiency of acetylated piece over control piece.
+Six percent phenol-formaldehyde adhesive, 40-lb/ft³ boards.

EXAMPLE XV

Solid wood prepared by the processes in Example I through Example V and flakeboards made from flakes prepared by the processes in Example VII through Example XIII were tested for decay resistance to brown-rot fungi.

Standard soil-block tests were run according to specifications of the American Society for Testing and Materials as outlined in D 1413. Acetylated and control solid wood (¾ by ¾ by ⅛ inch) and acetylated and control flakeboards (¾ by ¾ by ¼ inch) were placed in test with fungus with *Gloeophyllum trabeum*. Samples were removed at 12 weeks, and the extent of decay was determined as ovendried weight loss. Separate samples were water leached for 2 weeks at 25 degrees Centigrade, dried, and placed in test.

TABLE 5

| Example | Species | Weight percent gain | Average percent weight loss+ Leached | Nonleached |
|---------|---------|--------------------|---------|-----------|
| I | Southern pine | 19.2 | 1.3 | 1.1 |
| II | Ponderosa pine | 19.8 | 1.5 | 1.5 |
| III | Douglas-fir | 18.6 | 1.1 | 1.6 |
| IV | Maple | 16.4 | 1.3 | 1.2 |
| V | Aspen | 17.2 | 2.3 | 1.3 |
| VI | Southern pine* | 21.7 | 1.1 | .7 |
| VII | Douglas-fir* | 17.7 | 1.8 | 1.3 |
| VIII | Maple* | 16.4 | 2.1 | 1.2 |
| IX | Aspen* | 18.9 | 2.5 | 1.6 |
| XI | Southern pine* | 20.4 | .4 | .3 |
| XII | Douglas-fir* | 16.4 | 1.0 | 1.3 |
| XIII | Aspen* | 18.5 | 1.8 | 1.6 |

+Nontreated leached control samples lost between 35–60 percent weight during 12-wk test.
*Six percent phenol-formaldehyde adhesive, 40-lb/ft³ boards.

EXAMPLE XVI

Solid wood as prepared by the processes in Example I through Example V and jute and flakeboard made from flakes prepared by the processes in Example VII through Example XIII were tested for decay resistance to soft-rot fungi and tunneling bacteria.

Solid wood (1½ by ½ by ⅛ inch), jute (2 by 2 by 1/16 inch), and flakeboard samples (1 by 1 by ½ inch) were placed in test in a fungal cellar containing both soft-rot fungi and tunneling bacteria. Samples were inspected after 6 months and rated as follows: 0—no attack; 1—slight attack; 2—moderate attack; 3—heavy attack; 4—very heavy attack; 5—destroyed.

TABLE 6

| Example | Species | Weight percent gain | Rating after 6 months+ |
|---------|---------|--------------------|----------------------|
| I | Southern pine | 19.2 | 0 |
| II | Ponderosa pine | 19.8 | 0 |
| III | Douglas-fir | 18.6 | 0 |
| IV | Maple | 16.4 | 0 |
| V | Aspen | 17.2 | 0 |
| VI | Southern pine* | 21.7 | 0 |
| VII | Douglas-fir* | 17.7 | 0 |
| VIII | Maple* | 16.4 | 0 |
| IX | Aspen* | 18.9 | 0 |
| X | Jute | 15.6 | 0 |
| XI | Southern pine* | 20.4 | 0 |
| XII | Douglas-fir* | 16.4 | 0 |
| XIII | Aspen* | 18.5 | 0 |

+Nontreated control samples had an average rating of 4.5 after 6 months.
*Six percent phenol-formaldehyde adhesive, 40-lb/ft³ boards.

EXAMPLE XVII

In order to simulate a recirculation of solution recovered from earlier acetylation treatments, samples of oven-dried pine wood chips were dipped as described in Example VI in solutions of acetic anhydride and acetic acid of various concentrations. The samples were placed in a preheated cylinder at 120° C. and maintained for 2 hours at that temperature. Recovery of reagents and byproducts are as given in Example VI. The weight gains at the different acetic acid concentrations in the reactant mixture are shown in Table 7.

TABLE 7

| Species | Concentration of acetic acid in reactant, % | Weight percent gain % |
|---|---|---|
| Pine chips | 5 | 18.5 |
| | 13 | 18.7 |
| | 30 | 17.5 |
| | 38 | 17.1 |
| | 53 | 15.2 |
| | 55 | 16.0 |
| | 55 (5 hrs) | 18.0 |

We claim:

1. A method for catalyst-free acetylation of lignocellulosic material, comprising the steps of:
    contacting lignocellulosic material in the form of veneer, chips, flakes, fibers or particles with a liquid reactant consisting essentially of acetic anhydride and from about 10 percent to about 55 percent by volume acetic acid;
    heating the reactant-contacted lignocellulosic material at a temperature of up to 120° C. for a time sufficient to acetylate said material, the time of heating being from 1 to 5 hours; and,
    removing from the resulting acetylated lignocellulosic material unreacted acetic anhydride and acetic acid.

2. A method as described in claim 1 wherein the unreacted acetic anhydride and acetic acid is removed by vacuum and recovered.

3. A method as described in claim 1 wherein said reactant contains from about 10 percent to about 30 percent acetic acid.

4. A method as described in claim 1 wherein the temperature of heating is from 100° to 120° C.

5. A method as described in claim 1 wherein the step of contacting said lignocellulosic material with said reactant is accomplished by dipping the material in said reactant.

6. A method as described in claim 1 wherein the step of contacting said lignocellulosic material with said reactant is accomplished by spraying the material with said reactant.

7. A method as described in claim 1 wherein the acetylation results in a weight gain of from 13 percent to 21 percent.

8. A method as described in claim 1 wherein the lignocellulosic material to be processed has a moisture content of from 0 percent to about 20 percent by weight.

9. A method as described in claim 1 which further comprises the step of recovering the unreacted acetic anhydride and acetic acid.

10. A method as described in claim 2 wherein the time of heating is from 1 to 2 hours.

11. A method as described in claim 7 wherein the lignocellulosic material is softwood and the weight gain is from 15 percent to 21 percent.

12. A method as described in claim 7 wherein the lignocellulosic material is hardwood and the weight gain is from 13 percent to 18 percent.

13. A method as described in claim 9 wherein the recovered unreacted acetic anhydride and acetic acid is added back to the reactant with which the lignocellulosic material is to be contacted.

14. A method as described in claim 14 wherein the unreacted acetic anhydride and acetic acid is removed by a vaporization with a hot gas flow followed by condensation of the resulting vapors.

15. A method as described in claim 1 wherein the lignocellulosic material is wood.

16. A method as described in claim 5 wherein the dipping of the lignocellulosic material in the reactant is conducted for about 1 to 15 minutes.

17. A method as described in claim 1 and including removing excess reactant from the reactant-contacted lignocellulosic material prior to the heating of the reactant-coated lignocellulosic material.

18. A method as described in claim 16 and including removing excess reactant fro the reactant-dipped lignocellulosic material prior to the heating of the reactant-dipped lignocellulosic material.

* * * * *